(12) United States Patent
Chow

(10) Patent No.: US 7,779,177 B2
(45) Date of Patent: Aug. 17, 2010

(54) MULTI-PROCESSOR RECONFIGURABLE COMPUTING SYSTEM

(75) Inventor: Paul Chow, Mississauga (CA)

(73) Assignee: Arches Computing Systems, Toronto (CA)

( * ) Notice: Subject to any disclaimer, the term of this patent is extended or adjusted under 35 U.S.C. 154(b) by 760 days.

(21) Appl. No.: 11/195,409

(22) Filed: Aug. 2, 2005

(65) Prior Publication Data

US 2006/0031659 A1 Feb. 9, 2006

Related U.S. Application Data

(60) Provisional application No. 60/599,695, filed on Aug. 9, 2004.

(51) Int. Cl.
  G06F 3/00 (2006.01)
  G06F 5/00 (2006.01)
  G06F 15/76 (2006.01)
(52) U.S. Cl. .................................... 710/38; 712/11
(58) Field of Classification Search ............... 710/38; 712/11
  See application file for complete search history.

(56) References Cited

U.S. PATENT DOCUMENTS

| | | | |
|---|---|---|---|
| 4,591,980 A | 5/1986 | Huberman et al. | 364/200 |
| 4,622,632 A | 11/1986 | Tanimoto et al. | 364/200 |
| 4,709,327 A | 11/1987 | Hillis et al. | 364/200 |
| 4,720,780 A | 1/1988 | Dolecek | 364/200 |
| 4,873,626 A | 10/1989 | Gifford | 364/200 |
| 4,933,836 A | 6/1990 | Tulpule et al. | 364/200 |
| 4,942,517 A | 7/1990 | Cok | 364/200 |
| 5,020,059 A | 5/1991 | Gorin et al. | 371/11.3 |
| 5,361,373 A | 11/1994 | Gilson | 395/800 |
| 5,513,371 A | 4/1996 | Cypher et al. | 395/800 |
| 5,600,845 A | 2/1997 | Gilson | 395/800 |
| 5,684,980 A | 11/1997 | Casselman | 395/500 |
| 5,956,518 A | 9/1999 | DeHon et al. | 395/800.15 |
| 5,963,746 A | 10/1999 | Barker et al. | 395/800.2 |
| 6,526,491 B2 * | 2/2003 | Suzuoki et al. | 711/164 |
| 6,622,233 B1 | 9/2003 | Gilson | 712/11 |
| 7,215,137 B1 * | 5/2007 | Nisbet | 326/38 |
| 2003/0158991 A1 * | 8/2003 | Deyring et al. | 710/305 |
| 2004/0230866 A1 * | 11/2004 | Yates et al. | 714/25 |
| 2005/0256969 A1 * | 11/2005 | Yancey et al. | 709/238 |

* cited by examiner

*Primary Examiner*—Niketa I Patel
*Assistant Examiner*—Zachary K Huson
(74) *Attorney, Agent, or Firm*—T Andrew Currier; Stephen J. Perry; Perry + Currier Inc.

(57) ABSTRACT

A reconfigurable multi-processor computing system including a plurality of configurable processing elements each having a plurality of integrated high-speed serial input/output ports. Interconnects link the plurality of processing elements, wherein at least one of the integrated high-speed serial input/output ports of each processing element is connected by at least one interconnect to at least one of the integrated high-speed serial input/output ports of each other processing element, thereby creating a full mesh network. The full mesh network is located on a processor card, multiples of which may be grouped in a shelf having a backplane card with a shelf controller card for providing cross-connects between processor cards. Multiple shelves may be interconnected to form a large computer system.

20 Claims, 10 Drawing Sheets

MULTI-PROCESSOR RECONFIGURABLE COMPUTING SYSTEM

CROSS REFERENCE TO RELATED APPLICATIONS

The present application claims priority to U.S. provisional application Ser. No. 60/599,695, filed Aug. 9, 2004.

FIELD OF THE APPLICATION

The present application relates to a parallel processing and, in particular, to a configurable/reconfigurable multiprocessor computer system.

BACKGROUND

Application-Specific Processors (ASPs) have disappeared since the advent of the Very Large Scale Integration (VLSI) of integrated circuits (IC). VLSI has provided the basis for a general-purpose processor (the microprocessor) consisting of fixed circuits controlled by software programs to execute various tasks. The microprocessor takes advantage of the ability to integrate large fixed circuits and allow flexibility of task execution through software programs. These devices can be mass-produced at low cost. This makes it difficult to build ASPs that can stay ahead of the performance of microprocessors. Traditionally, it has been much easier to get performance by using the next generation of microprocessor and porting software to newer systems than it is to build ASPs.

To achieve higher performance systems using microprocessors it is necessary to connect them together to achieve greater computational parallelism. This requires a communication mechanism built upon a physical hardware connection scheme and software protocols built on top of the hardware. There are two general approaches to building these multiprocessor systems.

The most inexpensive approach is to connect a large number of commodity microprocessor-based computing systems, where the hardware level of communication uses a commodity protocol, such as Ethernet and the software is built upon a commodity protocol stack, such as TCP/IP.

This is a low-cost solution, but it suffers from the bandwidth and latency limitations of the hardware layer and the overhead of the protocol software.

The more expensive approach relies on more customized hardware. The hardware for communication is either based on circuits built outside of the microprocessor chip, which requires much more complexity in terms of the system design, or the communications hardware is implemented as part of the microprocessor chip. In this latter case, the chip is not likely to be a commodity part, and it is therefore much more expensive to develop. This approach can reduce the bandwidth and latency issues, but it will still incur the overhead of the software protocol layer, though it may be less than what exists in a commodity protocol stack.

With the development of programmable logic, such as Field-Programmable Gate Arrays (FPGAs), and Hardware Description Languages (HDLs), it is possible to reconsider the development of ASPs. Customized computational circuits can be described using an HDL and implemented in FPGAs by compilation (known as synthesis) of the HDL. As the VLSI technology improves, the circuits can be ported to the latest generation of FPGAs in a similar manner to porting software to an improved microprocessor.

Most complex computational problems require more than one processor to solve in a timely manner. A divide and conquer strategy is known in the art as parallel computing where complex problems are reduced into manageable smaller pieces of approximately the same size to be solved by an array of processors.

Massively parallel computer systems rely on connections to external devices for their input and output. Having each processor, or set of processors, connected to an external I/O device also necessitates having a multitude of connections between the processor array and the external devices, thus greatly increasing the overall size, cost and complexity of the system. Furthermore, output from multiple processors to a single output device, such as an optical display, is gathered together and funneled through a single data path to reach that device. This creates an output bottleneck that limits the usefulness of such systems for display-intensive tasks.

The trend in computing system design is to attempt to provide for the greatest degree of parallelism possible. Known designs use parallel connections between processors to provide fast data exchange. It will be appreciated that processor pin count and limited circuit board space are significant design limitations.

Despite advances in process technology and VLSI circuits, general-purpose processors are limited by chip size, consequently on-chip memory size, data latency, and data bandwidth. Furthermore, general-purpose processors are not as versatile as configurable logic in optimizations of specific tasks. There continues to be a need for an interconnect architecture of configurable logic to improve data latency and bandwidth. There also exists a need to apply architectural improvements to create a system that is scalable, low complexity, high density and massively parallel. It may also be advantageous to commercially provide for such systems using commodity parts to significantly reduce the risk of development and keeping pace with improvements in technology.

SUMMARY OF THE INVENTION

The present invention provides a reconfigurable multi-processor computer system having reduced communication latency and improved bandwidth throughput in a densely parallel processing configuration.

In one aspect, the present application provides a configurable computing system. The computing system includes a plurality of configurable processing elements each having a plurality of integrated high-speed serial input/output ports. The computer system also includes interconnects between the plurality of processing elements, wherein at least one of the integrated high-speed serial input/output ports of each processing element is connected by at least one interconnect to at least one of the integrated high-speed serial input/output ports of each other processing element, thereby creating full mesh network.

In some embodiments, the interconnects may include electrical traces, optical signal paths, RF transmissions, or other media for connecting corresponding high-speed serial input/output ports on respective processing elements. The high-speed serial input/output ports may be implemented using integrated serializer and deserializer transceivers capable of multi-gigabit bandwidth. In some embodiments, the high-speed serial input/output ports may be embodied in other multiplexer mechanisms.

In another aspect the present application provides a configurable processing card. The processing card includes a plurality of configurable processing means for implementing digital logic circuits based upon configuration instructions. The processing means includes a plurality of integrated input/ output means for high-speed output serialization and input deserialization of data. The processing card also includes interconnection means between the plurality of processing means for connecting at least one of the integrated input/output means on each processing means with at least one integrated input/output means of each other processing means, thereby creating a full mesh network.

In another aspect, the present invention provides a shelf, or chassis, including a plurality of the configurable processing cards and a shelf-level cross-connect for interconnecting the configurable processing cards. In yet another aspect, the present invention provides a computer system including a plurality of shelves and a system-level cross connect for interconnecting the shelves.

In one aspect of the invention, the hierarchy levels of the present invention are scalable. A computing system may be as small as a processing node or as large as a plurality of shelves. For example, a multi-shelf system may be connected together to form a supercomputing system, and the entire supercomputing system may take into account the total resources available and derive the optimal configuration to most efficiently use the entire computing system. In another embodiment, when a node-level, or a card-level, or a shelf-level fault is detected, the fault may be bypassed and its load divided amongst the rest of the computing system.

In one aspect of the invention, only specific functionality of an application is instantiated in a processing element. The programming of the computing system is done by describing the necessary hardware structures in a hardware description language, or any other language or description, that can be synthesized (compiled) into actual hardware circuits. The present invention takes advantage of the flexibility of the processing elements by configuring them to solve only the exact calculations at hand.

In another embodiment, processor element configuration may be managed to take advantage of parallel memory to effectively increase memory bandwidth. The wide memory bandwidth may allow parallelization of algorithms by divide-and-conquer. For instance, when an operation is to be applied to a large set of data, this set of data can be divided into smaller segments with which parallel operations can be performed by parallel execution units in the processor element.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

The following description is presented to enable any person skilled in the art to make and use the invention. Various modifications to the specific embodiments will be readily apparent to those skilled in the art, and the generic principles defined herein may be applied to other embodiments and applications without departing from the spirit and scope of the invention. Moreover, in the following description, numerous details are set forth for the purpose of explanation; however, any persons skilled in the art would realize that certain details may be modified or omitted without affecting the operation of the invention. In other instances, well-known structures and devices are shown in block diagram form in order not to obscure the description with unnecessary detail. Thus the present invention is not intended to be limited to the embodiment shown, but is to be accorded the widest scope consistent with the principles and features disclosed herein.

Figure 1:
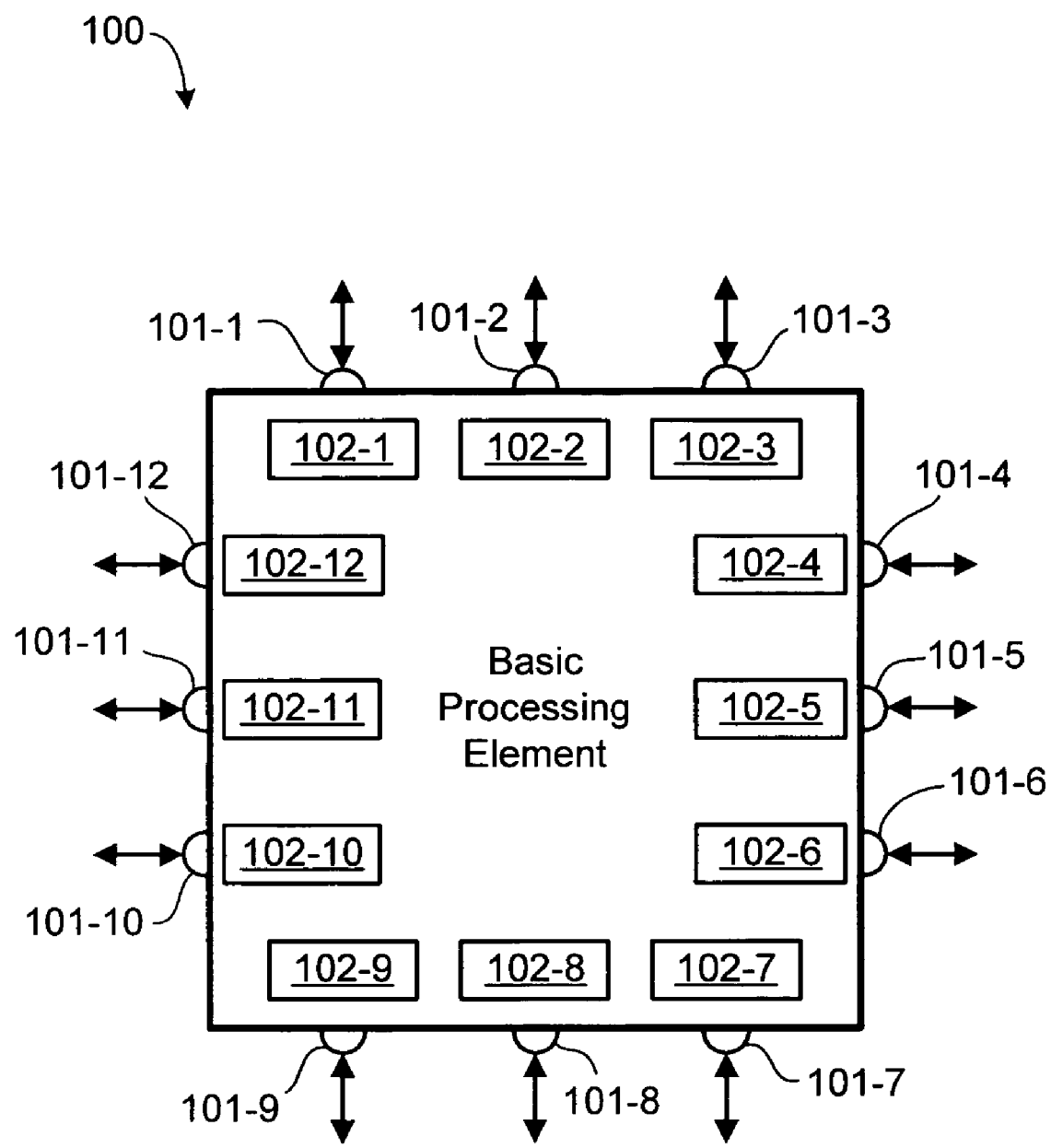
FIG. 1 shows, in block diagram form, a basic processing element.

Reference is first made to FIG. 1, which shows, in block diagram form, a basic processing element (PE) 100. The basic processing element 100 comprises a configurable logic device for implementing digital logic circuit(s). In one embodiment the basic processing element 100 comprises a field-programmable gate array (FPGA). In many such embodiments, the FPGA includes other integrated and dedicated hardware such as, for example, blocks of static random access memory (SRAM), multipliers, shift registers, carry-chain logic for constructing fast adders, delay-lock loops (DLLs) and phase-lock loops (PLLs) for implementing and manipulating complex clocking structures, configurable input/output (I/O) pads that accommodate many I/O standards, and/or embedded microprocessors.

The basic processing element 100 shown in FIG. 1 includes a plurality of high-speed serial input/output (I/O) ports 101 (shown individually as 101-1, 101-2, . . . , 101-12). The embodiment illustrated in FIG. 1 shows twelve such high-speed serial I/O ports 101, but it will be understood that other embodiments may have fewer or more high-speed serial I/O ports 101.

The basic processing element 100 includes a plurality of integrated transceivers 102 (shown individually as 102-1, 102-2, . . . , 102-12) for enabling multi-gigabit serial transmissions through the high-speed serial input/output (I/O) ports 101. Each transceiver 102 includes serialization-deserialization (SERDES) circuitry for serializing and deserializing data within the processing element 100, and includes clock data recovery (CDR) circuitry to achieve input and output serial data rates of multi-gigabits per second.

In many cases, the basic processing element 100, like an FPGA, may be available as a commodity part. An example of such a part is the Xilinx Virtex II Pro series of FPGAs. The Xilinx Virtex II Pro series FPGAs include multi-gigabit transceivers for implementing multi-gigabit input ports and multi-gigabit output ports using SERDES and CDR technology.

The processing element 100 may also or alternatively include internal memory blocks distributed throughout the device. Typically, such internal memory may come in a number of different sizes, ranging from rather small blocks, such as 16×1 bits, to very large blocks, such as 16K bits or even larger. Larger internal memory blocks may be configurable in many aspect ratios (16K×1, 8K×2, 4K×4, 2K×8, etc.).

Figure 2:
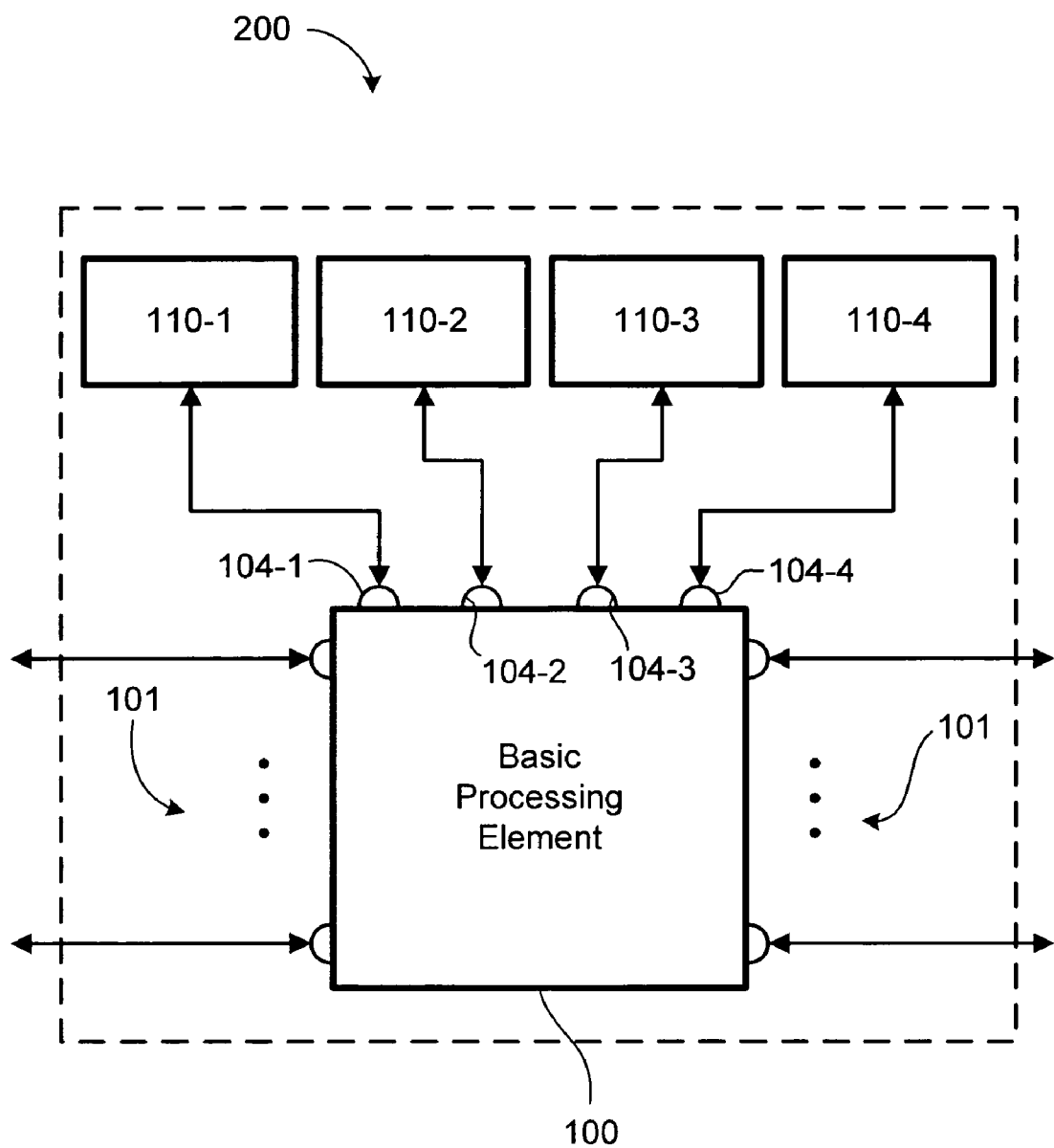
FIG. 2 shows a block diagram of an embodiment of a processing node.

Reference is now made to FIG. 2, which shows a block diagram of an embodiment of a processing node 200. The processing node 200 includes the basic processing element 100 and one or more external memory chips 110 (shown individually as 110-1, 110-2,110-3, and 110-4). The external memory chips 110, may in various embodiments, include high-speed SRAM and/or dynamic random-access memory (DRAM). The external memory chips 110 are connected to the basic processing element 100.

The basic processing element 100 includes a plurality of general purpose configurable I/O pins/ports 104 (shown as 104-1, . . . , 104-4) that are available for transporting data into and out of the processing element 100. In some embodiments, the general purpose I/O pins 104 connect the processing element 100 to the external memory 110.

In one embodiment, each memory chip 110-1 to 110-4 is comprised of a 512K×32 SRAM chip such as the CY7C1062AV33 from Cypress Semiconductors, for a total of four 512K×32 SRAMs. For some applications it may be advantageous to use eight 1M×16 SRAM chips such as the CY7C1061AV33 from Cypress Semiconductors instead of the 512K×32 SRAM chips. With the 1M×16 SRAM it would be possible to configure more than four separate memory banks if the widths of the banks do not have to be larger than 16 bits. The memory chips 110 attached to the processing element 100 can be other sizes, as may be required by the applications being considered. The total number of memory chips 110 required may change as determined by the needs of each application and may be selected depending on the applications intended to run on the overall system. A tradeoff may be made between the number of chips required versus the flexibility and total amount of memory required.

Figure 3:
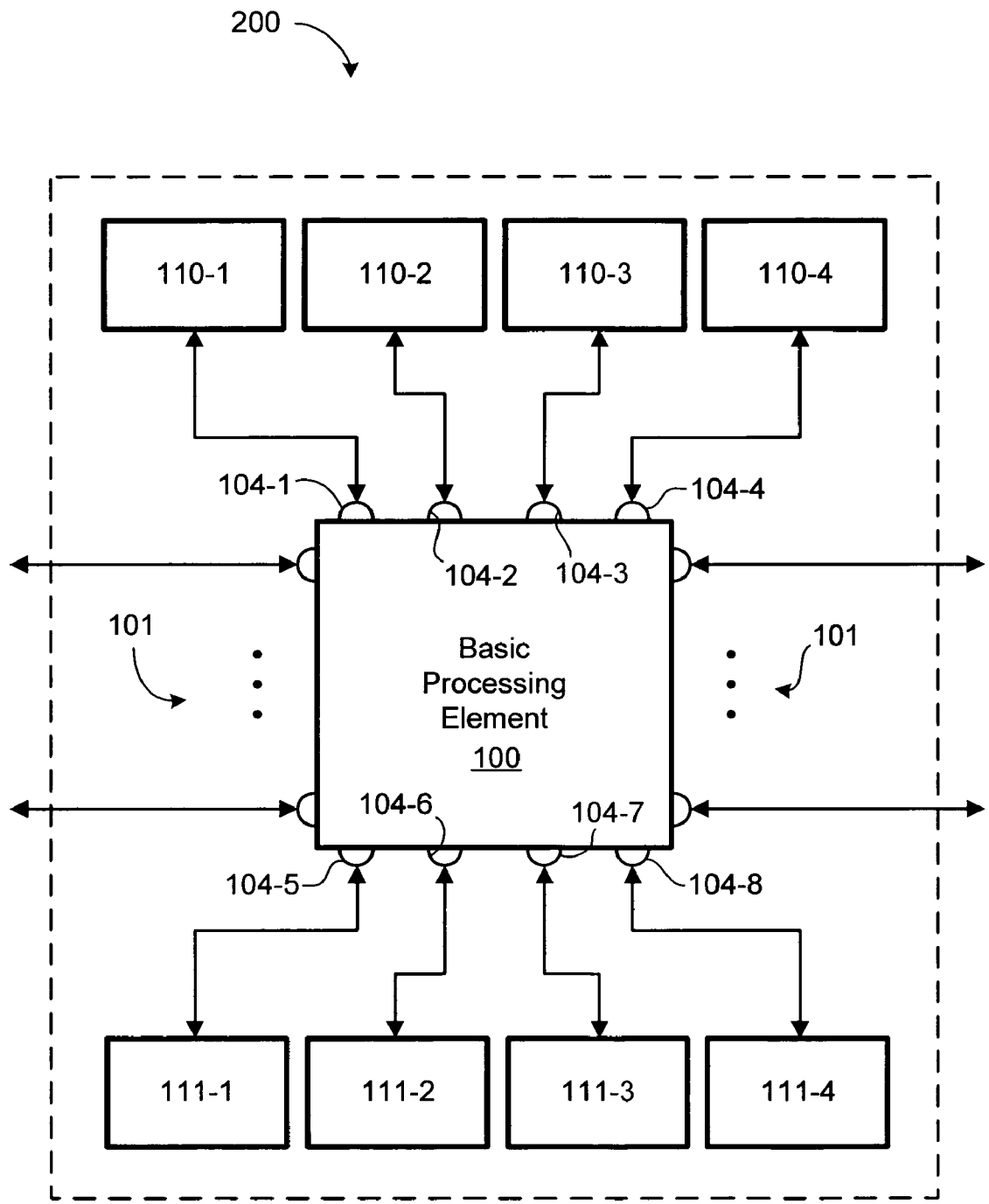
FIG. 3 shows, in block diagram form, a further embodiment of the processing node.

Reference is now also made to FIG. 3, which shows, in block diagram form, a further embodiment of the processing node 200. In this embodiment, the processing node 200 includes a number of large memory blocks 111 (shown as 111-1 to 111-4) in addition to the memory chips 110-1 to 110-4. In one embodiment, each large memory block 111 comprises a 32M×16 double-data rate (DDR) synchronous dynamic random access memory (SDRAM) chip such as the MT46V32M16 from Micron Technology Inc. These DDR SDRAM chips are connected to the general purpose I/O pins 104 of the processing element 100. The number and size of the large memory blocks 111 is also subject to the requirements of the applications and could change as required depending on the applications intended to run on the overall system.

In FIGS. 2 and 3, it will be noted that external data connections to the processing node 200 are made by way of the high-speed serial I/O ports 101.

Figure 4:
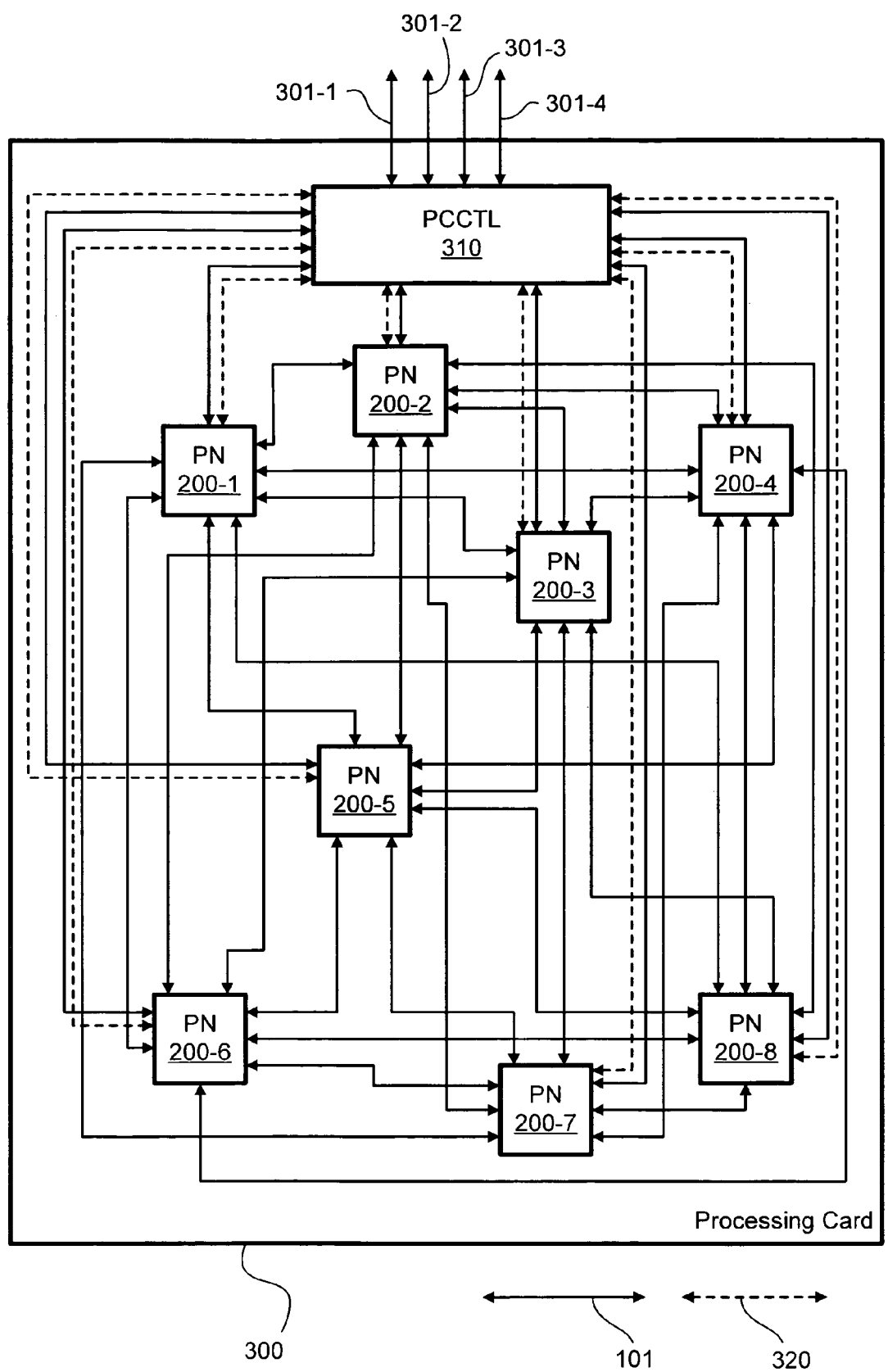
FIG. 4 shows an embodiment of a processing card.

Reference is now made to FIG. 4, which shows an embodiment of a processing card 300 in accordance with an aspect of the present invention. The processing card 300 includes a printed-circuit board (PCB) upon which is located a plurality of processing nodes 200 (shown individually as 200-1 to 200-8). Each processing node 200 is connected to each other processing node by way of a high-speed serial connection. The interconnection between each pair of processing nodes 200 is made by connecting together at least one of the high-speed serial I/O ports 101 on one processing node 200 with at least one of the high-speed serial I/O ports 101 on another processing node 200. By providing a direct connection between every processing node 200, a full mesh network of processing nodes 200 is produced. In some embodiments, additional connections are made between the processing nodes 200, i.e. the basic processing elements 100, by way of the general purpose I/O pins 104.

In the embodiment illustrated in FIG. 4, the serial connection between each pair of processing nodes 200 may comprise a differential configuration wherein two parallel electrical paths (e.g. traces) interconnect a pair of high-speed serial I/O ports 101 on one processing element 100 with a pair of high-speed serial I/O ports 101 on another processing element 100. In another embodiment, the serial connection or path between processing elements 100 may be implemented using photonic (i.e. optical) signals. In yet another embodiment, the connection may be made by wireless radio frequency signals. Other implementations will be understood by those of ordinary skill in the art.

The embodiment shown in FIG. 4 shows eight processing nodes 200. Accordingly, in an embodiment in which the serial connections between processing nodes 200 are implemented as differential signals, each processing element 100 includes at least seven high-speed serial I/O ports 101 so as to connect to the other seven processing elements 100. Each high-speed serial I/O port consists of one differential pair input port and one differential pair output port. In any specific implementation the actual number of processing nodes 200 is subject to the limitations of the size of the PCB and the number of high-speed serial I/O ports 101 available on each processing element 100.

The processing card 300 also includes a processing card control block (PCCTL) 310. Every processing node 200 on the processing card 300 is connected to the PCCTL 310 using at least one of the high-speed serial I/O ports 101 on its processing element 100. Accordingly, in this embodiment, the processing elements 100 include at least eight high-speed I/O ports 101.

In addition to the high-speed serial I/O port 101 connections between the PCCTL 310 and the processing nodes 200 there may also a set of processing node control signals (PNCTLSIG) shown in dashed lines as signals 320. In some embodiments the PNCTLSIG 320 may be used as serial data configuration lines to configure the processing node 200 or, more particularly, to configure the configurable processing element 100. For example, in an embodiment wherein the processing element 100 comprises a Xilinx Virtex II Pro device, the PNCTLSIG 320 may enable the processing node 200 to be programmed using a slave-serial mode.

In another embodiment, the PNCTLSIG 320 may provide parallel data configuration lines to configure the processing node 200. When using Xilinx Virtex II Pro devices, such lines would enable the processing element 100 to be programmed using SelectMAP mode and for Readback of the configuration data.

In yet another embodiment, the PNCTLSIG 320 may provide JTAG lines for standard JTAG connectivity. Such an embodiment may also permit configuration of a Xilinx Virtex II Pro device using a Boundary-scan mode.

In yet a further embodiment, the PNCTLSIG 320 may function as Interrupt lines to signal events on the processing node 200 back to the PCCTL 310. They may also or alternatively provide for low-speed communication lines running, for example, at approximately 50 to 100 MHz. These lines may be used for communication of user-defined information between the PCCTL 310 and the processing node 200.

The exact topology of the connections may vary according to design and manufacturing considerations.

The processing card 300, and the PCCTL 310 in particular, may include a plurality of card-level high-speed serial I/O ports (CLHSIO) 301 (shown as 301-1, 301-2, 301-3, and 301-4). These CLHSIO 301 enable the processing card 300 to be connected to other processing cards 300 in order to build larger systems. In one embodiment, the CLHSIO 301 are of the same technology as the high-speed serial I/O ports 101 used to interconnect the processing nodes 200.

Figure 5:
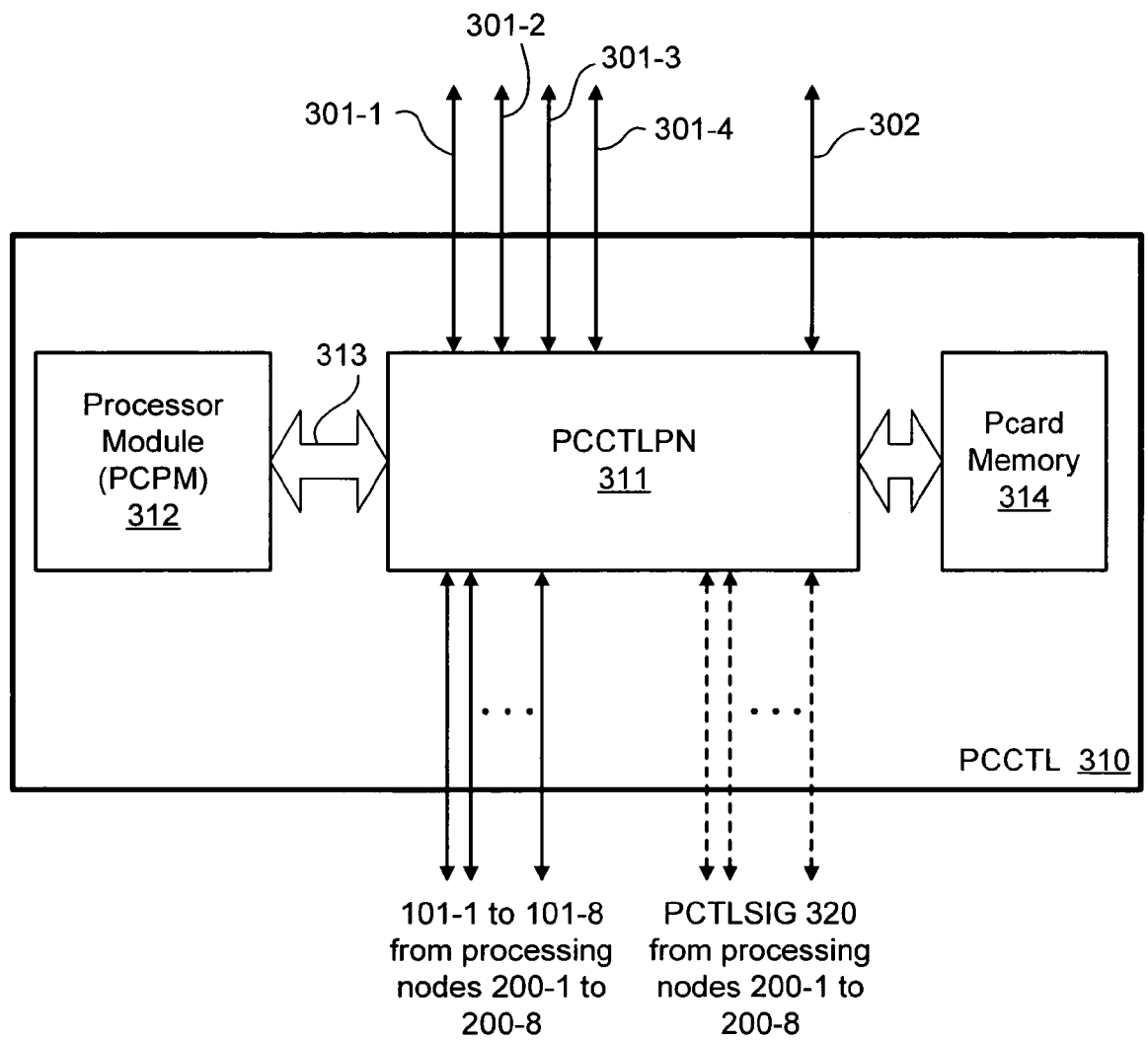
FIG. 5 shows, in block diagram form, an embodiment of a processing card control block.

Reference is now made to FIG. 5, which shows in block diagram form an embodiment of the PCCTL 310. The PCCTL 310 may be thought of as a special purpose processing node for processing card-level communications and enabling interconnection of the processing card 300 (FIG. 4) with other processing cards 300.

The PCCTL 310 may include a processing card control processing node (PCCTLPN) 311, which provides a processing node for processing card-level communications. In one embodiment, the PCCTLPN 311 may be implemented by a FPGA, such as the Virtex II Pro FPGA. The PCCTLPN 311 may have similar features as the processing nodes 200, although in some embodiments the PCCTLPN 311 may need a larger number of those features. For example, the PCCTLPN 311 may require more high-speed serial I/O ports 101 and/or more internal logic capacity than the processing nodes 200. Accordingly, in one embodiment, the PCCTLPN 311 is implemented using a larger Virtex FPGA than is used for the processing nodes 200. In another embodiment, the PCCTLPN 311 is implemented using two or more Virtex II Pro FPGAs.

The PCCTLPN 311 is the block through which the processing card 300 can connect to other processing cards 300 in larger systems. All processing nodes 200 on a processor card 300 are connected into the PCCTLPN 311 using the high-speed serial I/O ports 101, and therefore they may communicate through the PCCTLPN 311 with other processor cards 300 using the CLHSIO 301.

The PCCTL 310 may also include a processor card processor module (PCPM) 312 and a processor card (PCard) memory 314. The PCPM 312 may communicate with the PCCTLPN 311 using bus 313. The bus 313 may use a standard bus protocol, such as PCI, but other protocols, whether standard or proprietary, may be used.

The PCPM 312 may provide a general-purpose processor useful in implementing various functions. For example, the PCPM 312 may communicate with an external host computer using, for example, a standard networking protocol such as Gigabit Ethernet, although it will be appreciated that any protocol, standard or proprietary, could be used. In another example, the PCPM 312 may play a role in the overall computation being carried out by the processor card 300. The PCPM 312 may also participate in data management, for example by communicating data between the PC 300 and a host computer.

In one embodiment, the PCPM 312 is implemented using a commercially available processor module that includes Ethernet communications capability and a PCI bus that is accessible for connecting the PCCTLPN 311. A lower cost system may be constructed by implementing the processor inside the PCCTLPN 311. For example, the PCCTLPN 311 may be implemented using a Xilinx Virtex II Pro FPGA, which itself contains a Power PC processor that could be used as the processor for the PCPM 312. Another option is to implement a soft processor in the programmable logic of the Xilinx Virtex II Pro FPGA, such as the MicroBlaze processor that is available from Xilinx. It will be appreciated that additional memory may need to be provided for the processor and a communications link with a host computer may need to be implemented. The logic may be implemented in the PCCTLPN 311 and additional physical-layer chips and devices may be required to provide the proper electrical signaling.

The PCard Memory 314 may include a local memory that is directly attached to the PCCTLPN 311. The PCard memory 314 may be implemented using memory elements similar to the memory chips 110 (FIG. 2) and/or memory blocks 110 (FIG. 3) described in connection with the processor nodes 200 (FIG. 2). In some embodiments, the amount of memory in the PCard memory 314 is likely to be more than the amount of memory used in the processing node 200, but that may be determined by the range of applications being considered.

Figure 6:
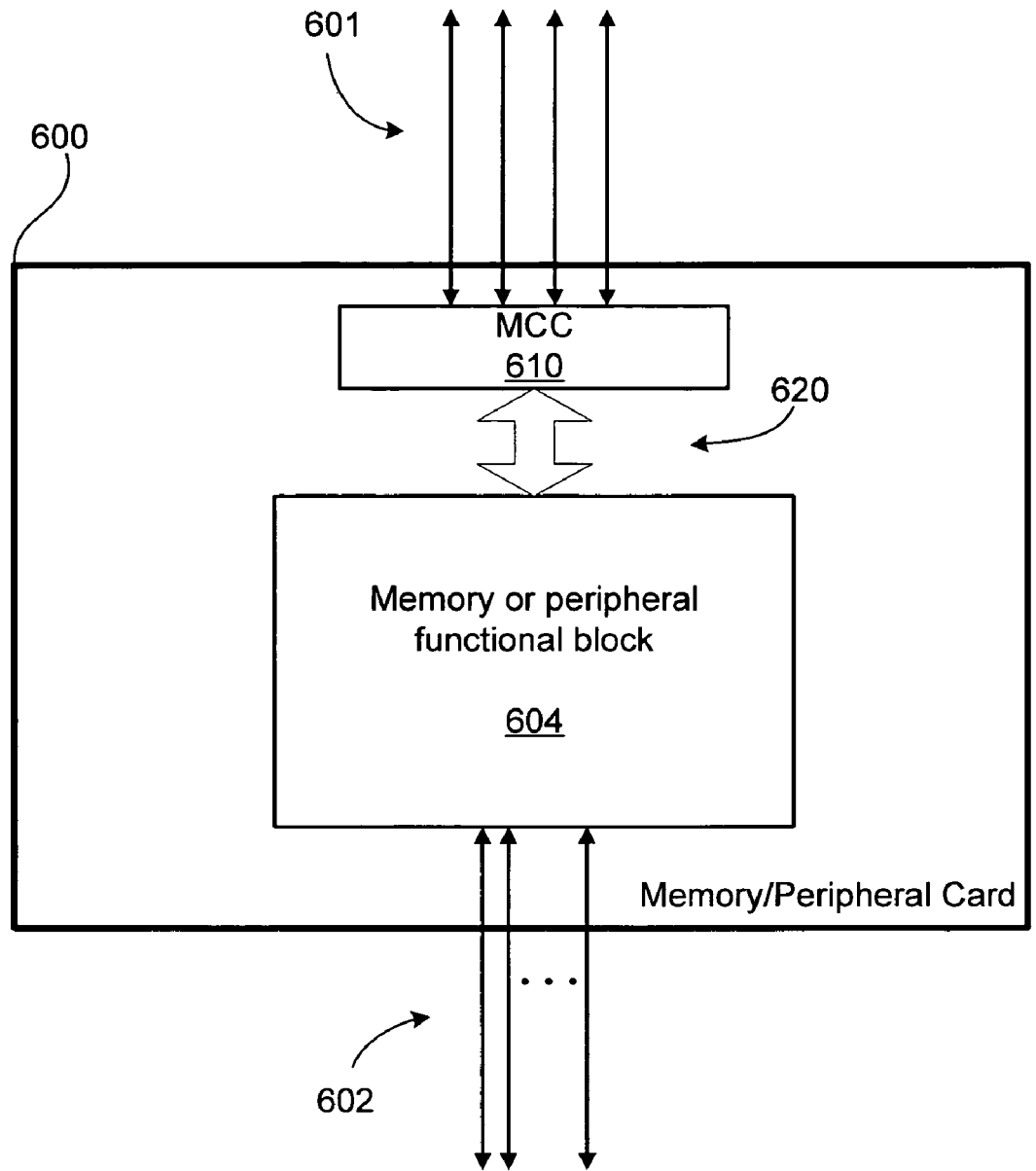
FIG. 6 shows a block diagram of an embodiment of a memory/peripheral card.

Reference is now made to FIG. 6, which shows a block diagram of an embodiment of a memory/peripheral card 600. The memory/peripheral card 600 may be implemented so as to provide additional local storage, such as memory and disk drives, or I/O access to external systems. The memory/peripheral card 600 include a memory or peripheral functional block 604, which may includes memory blocks, disk drives, I/O access to external systems, or other such functional blocks. For example, a memory card might contain a large number of memory chips. A disk card could contain a number of disk drives mounted on the card. The functional block 604 may also be a network interface, such as a number of Gigabit Ethernet ports that may be used to connect Gigabit Ethernet devices.

The memory/peripheral card 600 may include peripheral I/O ports 602 for connecting to peripheral off-card devices. In one embodiment the peripheral I/O ports 602 are Gigabit Ethernet ports that are accessible for connecting to external devices.

The memory/peripheral card 600 also includes a memory card controller (MCC) 610 which interfaces with the memory or peripheral functional block 604 via a memory card bus 620 and control signals. The memory card bus 620 interface may be customized for the particular function/operation implemented in the memory or peripheral functional block 604.

The structure of the MCC 610 may be similar to the PCCTL 310 (FIG. 4). The MCC 610 may provide a number of card-level high-speed serial I/O ports 601 similar to the CLHSIO 301 (FIG. 3) for interfacing the memory card 600 to a backplane and connecting it to one or more processing cards 300 (FIG. 4)

Figure 7:
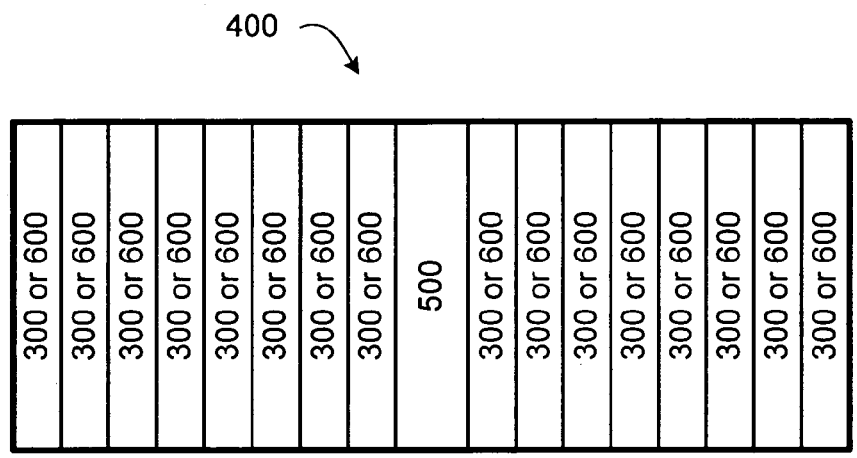
FIG. 7 shows a block diagram of an embodiment of a shelf.
Figure 8:
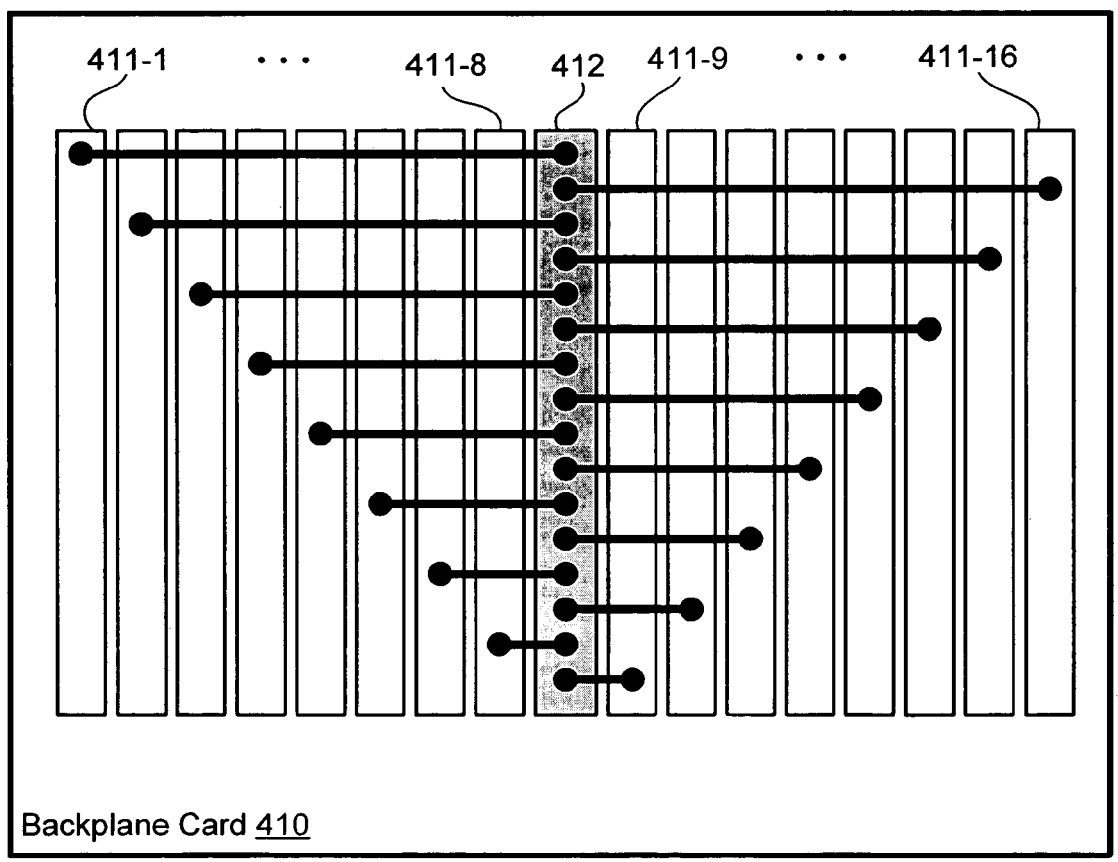
FIG. 8 shows, in block diagram form, an embodiment of a backplane card for assembling the shelf.

Reference is now made to FIGS. 7 and 8. FIG. 7 shows a block diagram of an embodiment of a shelf 400. FIG. 8 shows, in block diagram form, an embodiment of a backplane card 410 for assembling the shelf 410.

The shelf 400 includes the backplane card 410 and a number of processing cards 300 and/or memory/peripheral cards 600. In one embodiment, the backplane card 410 provides up to sixteen slots for the insertion of cards 300 or 600. Each slot comprises a card backplane connector 411 (shown individually as 411-1 to 411-16).

An additional slot with a controller card connector 412 is available on the backplane card 410 for insertion of a shelf controller card (SCC) 500. In one embodiment, this slot is provided in the middle of the shelf 400 with approximately half of the processor cards 300 on each side, although other arrangements are possible. In this embodiment, the SCC 500 is placed in the middle to reduce the length of the maximum connection to the furthest card 300 or 600.

The processor card connectors 411 are used to connect the CLHSIO 301 from each processor card 300 to the backplane card 410. All of the CLHSIO 301 are routed on the backplane card 410 to the controller card connector 412 and, therefore, to the SCC 500. In one embodiment, the connectors 411 and 412 can also be used to distribute power to the processor cards 300 and the SCC 500. Also, the connectors 411 and 412 may carry other signals between the shelf control block 520 and the processor cards 300.

Figure 9:
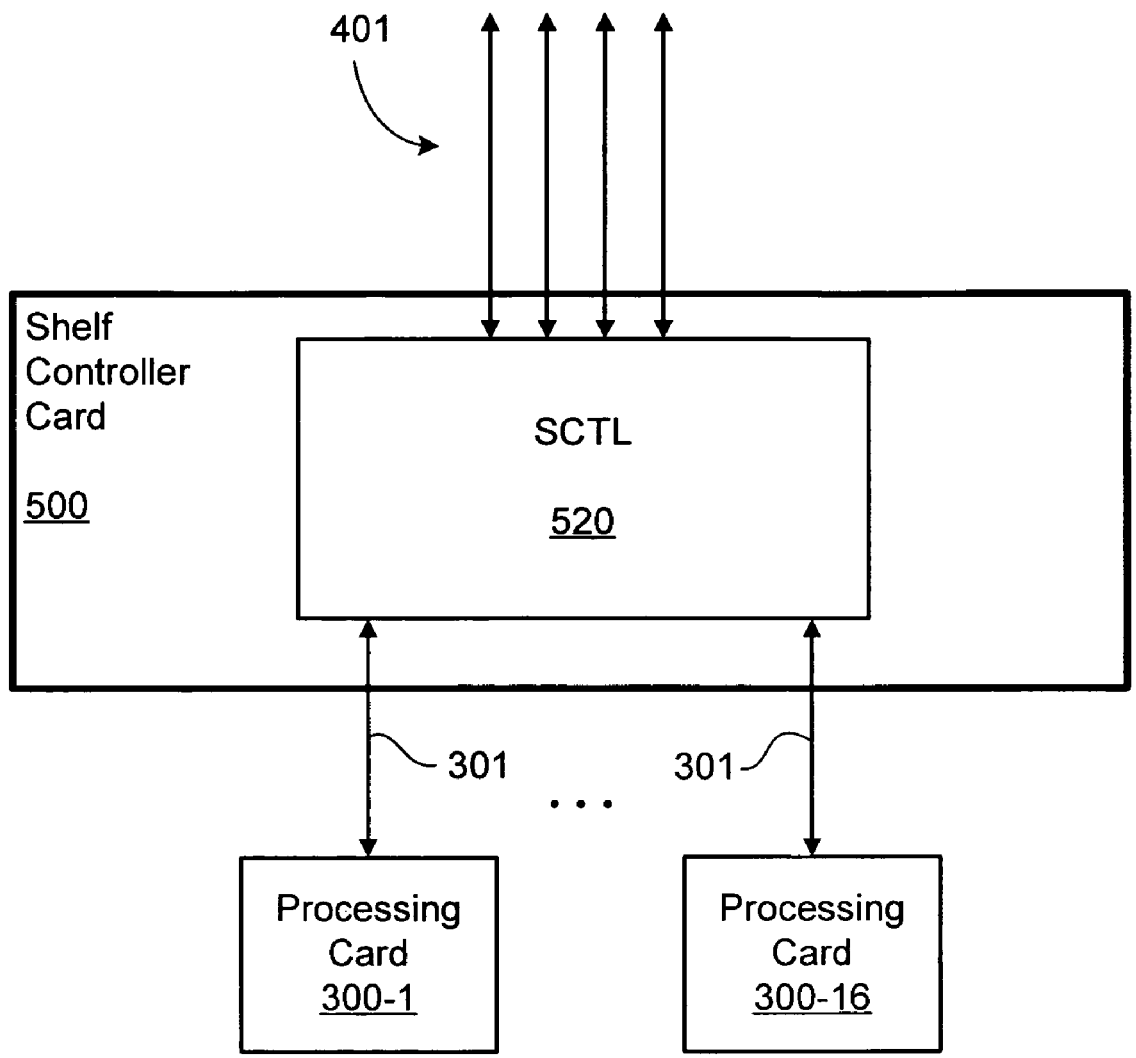
FIG. 9 shows, in block diagram form, the logical connectivity between cards in the shelf.
Figure 10:
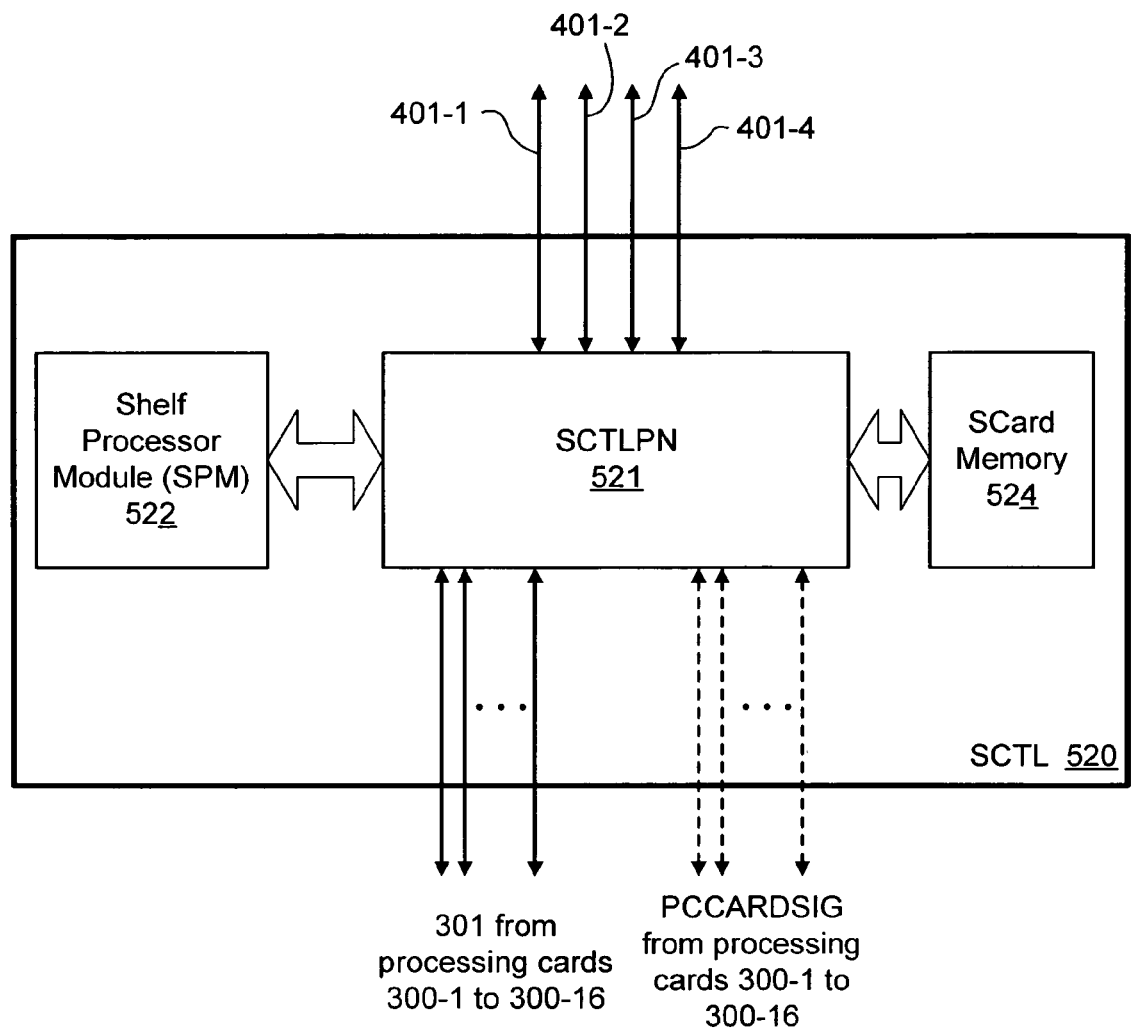
FIG. 10 shows a block diagram of an embodiment of a shelf control block.

Reference is now made to FIGS. 9 and 10. FIG. 9 illustrates, in block diagram form, the logical connectivity between cards in the shelf 400. The SCC 500 includes a shelf control block (SCTL) 520 that connects to the CLHSIO 301 through the controller card connector 412 (FIG. 8), backplane card 410 (FIG. 8) and processor card connectors 411 (FIG. 8).

FIG. 10 shows a block diagram of an embodiment of the SCTL 520. The SCTL 520 may function in a manner similar to the PCCTL 310 (FIG. 5). The SCTL 520 includes a shelf control processing node (SCTLPN) 521, a shelf processor module (SPM) 522, and shelf card (SCard) memory 524. The SCTLPN 521 is the communications processing node for the shelf 400. In one embodiment, the SCTLPN 521 may be implemented by a Virtex II Pro FPGA. The SCTLPN 521 may provide the same types of features as the PCCTLPN 311 (FIG. 5).

The SCTLPN 521 connects through the controller card connector 412 to all processing cards 300-1 to 300-16 on the shelf 400. Data from one processing card 300 may be transmitted to another processing card 300 in the same shelf 400 via the SCTLPN 521. The data may be transmitted using the CLHSIO 301 connecting each processing card 300 to the SCTLPN 521 via the backplane card 410 (FIG. 8).

The SCTLPN 521 may also provide a number of shelf-level high-speed serial I/O ports (SLHSIO) 401 (shown as 401-1 to 401-4). The SLHSIO 401 may be used to build larger systems that consist of a number of shelves 400.

The SPM 522 may be implemented in a similar manner as the PCPM 312 (FIG. 5). It comprises a general-purpose processor that may used for several purposes, including communicating with an external host computer using a standard networking protocol, communicating with the SCTLPN 521 using a standard bus protocol, participating in the overall computation, and/or taking on tasks that are not so time critical.

In one embodiment, instead of using an FPGA for the cross-connection of the SLHSIO 401, a dedicated cross-connect chip, such as the Mindspeed M21130 68×68 3.2 Gbps Crosspoint Switch or the Mindspeed M21156 144×144 3.2 Gbps Crosspoint Switch may be used. This may give more cross-connect capacity.

In one embodiment, the processing cards 300 and memory and peripheral cards 600 may be inserted and removed while the system is running. This hot swap feature allows maintenance and upgrades to be performed while allowing other parts of the system to be running. The software system can be used to help with this activity by ensuring that the tasks running on the system avoid the regions affected.

Figure 11:
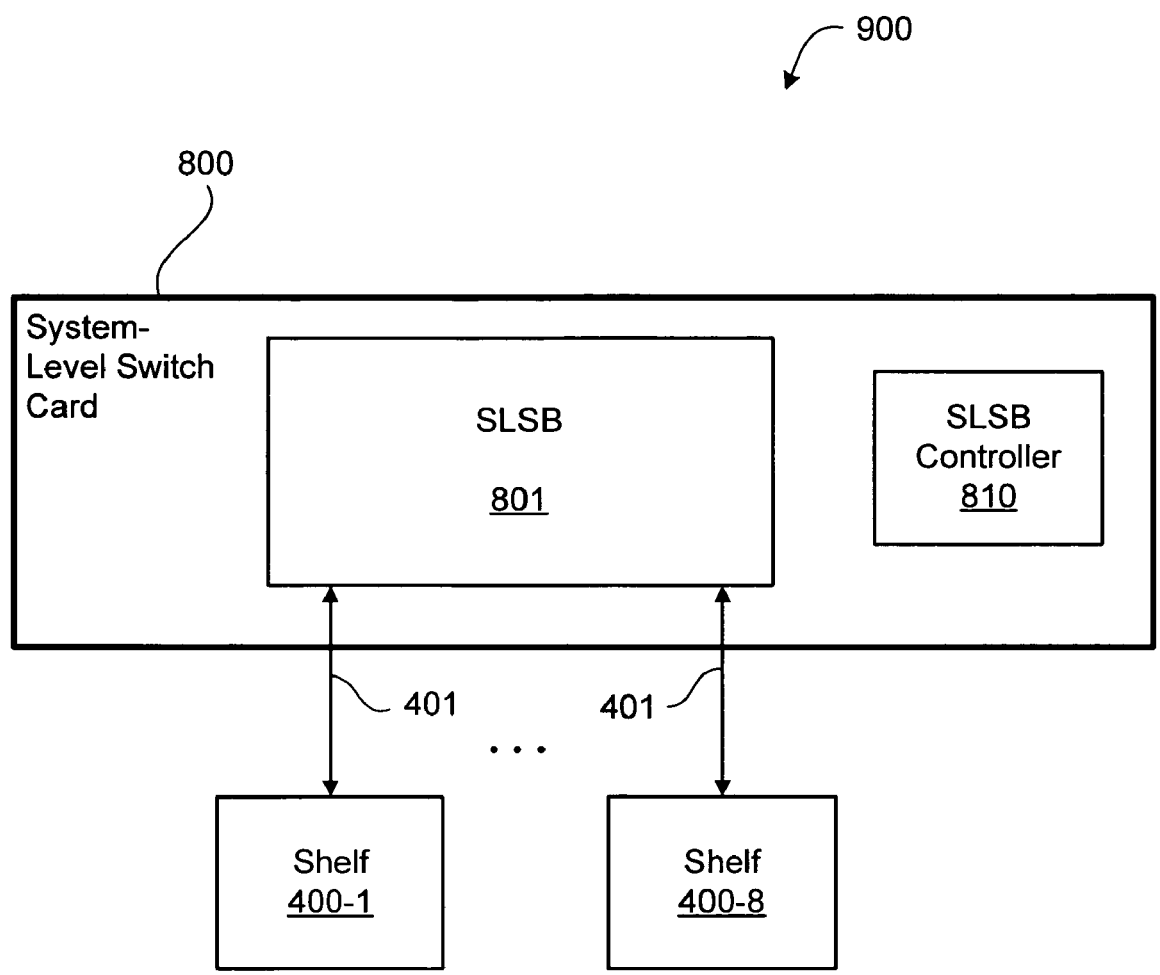
FIG. 11 shows a block diagram of a multi-shelf computer system.

Reference is now made to FIG. 11, which shows a block diagram of a multi-shelf computer system 900. The system 900 includes a plurality of shelves 400 and a system-level switch card 800. The system-level switch card 800 interconnects the SLHSIO 401 from the SCCs 500. This configuration provides connectivity between processor cards 300 (FIG. 8) on different shelves 400. The system-level switch card 800 includes a system-level switch box (SLSB) 801 operating under the control of a SLSB controller 810.

Since the SLSHIO 401 connections to the SCCs 500 are likely to be quite long, in some embodiments they may be implemented with optical fibres interfaced with electrical/optical and optical/electrical interfaces.

In some embodiments, the number of SLHSIO 401 may be equal to the number of CLHSIO 301 from the processor cards 300. If the number of ports on the system-level switch box SLSB 801 is adequate, then any card may directly connect to any other card. For example, with the Mindspeed M21156 144×144 Crosspoint Switch, up to eight shelves 400 of 16 processor cards 300 may be connected in this manner. In one embodiment, the SLSB controller 810 may be an FPGA or microprocessor that is used to control and configure the SLSB 801. The SLSB controller 810 may also be connected to a host computer or some other central controller that is scheduling the activity of the multi-shelf computer system 900.

Although some of the above-described embodiments refer to the use of field programmable logic devices, and in particular field programmable gate arrays, for implementing processing elements, those skilled in the art will recognize that the present invention is not so limited. Other programmable logic devices may be used; for example, on-time programmable (OTP) devices may serve as one or more of the processing elements. In yet another embodiment, the processing elements may be implemented by way of an ASIC derived from an FPGA design, such as through the HardCopy™ technology developed by Altera Corporation of San Jose, Calif. This technology provides for the migration of FPGA designs to an ASIC.

Those skilled in the art will also understand that references herein to a printed circuit board and electric traces on a printed circuit board do not limit the present invention to such embodiments. Some embodiments may include elements disposed on another substrate, such as a silicon wafer or ceramic module. Other variations will be apparent to those skilled in the field.

The teachings of the present application may be embodied in other specific forms without departing from the spirit or essential characteristics thereof. Certain adaptations and modifications will be obvious to those skilled in the art. The above discussed embodiments are considered to be illustrative and not restrictive.

What is claimed is:

1. A configurable computing system, comprising:
a plurality of configurable processing elements each having a plurality of integrated high-speed serial input/output ports; and
interconnects between the plurality of processing elements, at least one of the integrated high-speed serial input/output ports of each processing element is connected by at least one interconnect to at least one of the integrated high-speed serial input/output ports of each other processing element forming a processing card, and at least one of the configurable processing elements in the processing card having one or more of its integrated high-speed serial input/output ports for connecting to other processing cards.

2. The computing system claimed in claim 1, wherein said interconnects and said processing elements form a full mesh network.

3. The computing system claimed in claim 1, wherein said interconnects directly connect respective integrated high-speed serial input/output ports.

4. The computing system claimed in claim 3, wherein said interconnects comprise a signal path chosen from the group including an electrical path, an optical path, and an RF transmission link.

5. The computing system claimed in claim 3, wherein one integrated high-speed serial output port and one integrated high-speed serial input port on each processing element are connected to corresponding integrated high-speed serial input and output ports, respectively, on each other processing element by parallel electrical traces, and wherein the interconnected processing elements utilize differential signalling.

6. The computing system claimed in claim 1, wherein each of said plurality of configurable processing elements comprises a programmable logic device for implementing digital circuits.

7. The computing system claimed in claim 6, wherein said programmable logic devices comprise field programmable logic devices.

8. The computing system claimed in claim 7, wherein said integrated high-speed serial input/output ports of said field programmable logic devices each include an integrated serializer/deserializer transceiver and clock data recovery circuitry.

9. The computing system claimed in claim 1, wherein said processing elements and said interconnects are disposed upon a common substrate, and wherein one of said processing elements comprises a processor card control block for routing communications between said substrate and other substrates, said processor card control block including a plurality of card-level high-speed serial input/output ports for sending and receiving said communications.

10. The computing system claimed in claim 9, wherein said processor card control block includes one of said processing elements and a processor module connected by a bus.

11. The computing system claimed in claim 9, including a shelf containing a plurality of said substrates, and a backplane card for interconnecting said plurality of substrates, said backplane card including interconnectors for connecting to said card-level high-speed serial input/output ports and including a shelf control card, wherein said shelf control card provides reconfigurable cross-connects between said substrates.

12. The computing system claimed in claim 11, further including a plurality of said shelves and a system-level switch card for interconnecting said shelves.

13. The computing system claimed in claim 1, further including one or more local memory blocks connected to one of said processing elements to form a processing node.

14. A configurable processing card, comprising:
a plurality of configurable processing means for implementing digital logic circuits based upon configuration instructions, wherein said processing means includes a plurality of integrated input/output means for high-speed output serialization and input deserialization of data; and
interconnection means between the plurality of processing means for connecting at least one of the integrated input/output means on each processing means with at least one integrated input/output means of each other processing means forming a processing card, and at least one of the configurable processing elements in the processing cards having one or more of its integrated high-speed serial input/output means for connecting to other processing cards.

15. The processing card claimed in claim 14, wherein said interconnection means and said processing means form a full mesh network.

16. The processing card claimed in claim 14, wherein one integrated input means and one integrated output means on each processing means are connected to corresponding integrated input means and integrated output means, respectively, on each other processing means by parallel electrical traces, and wherein the interconnected processing means utilize differential signalling.

17. The processing card claimed in claim 14, wherein said integrated input/output means each include an integrated serializer/deserializer transceiver means and clock data recovery means.

18. The processing card claimed in claim 15, wherein said full mesh network of processing means and said interconnection means are disposed upon a substrate, and wherein one of said processing means includes means for routing communications between said substrate and other substrates.

19. A processing shelf, comprising a plurality of said substrates as claimed in claim 18, each having one of said full mesh networks, and a backplane card for interconnecting said plurality of substrates, said backplane card including interconnection means for connecting to said means for routing communications.

20. The computer system comprising a plurality of shelves as claimed in claim 19 and a system-level switch card for interconnecting said shelves.

* * * * *